United States Patent [19]

Annighofer et al.

[11] Patent Number: 4,885,331

[45] Date of Patent: Dec. 5, 1989

[54] POLYESTER MELT-ADHESIVE COMPOSITIONS AND METHODS OF MAKING AND USING THEM

[75] Inventors: Frank Annighofer, Heidenrod, Fed. Rep. of Germany; Ewald Schneider, Domat/Ems; Hans-Joachim Schultze, Chur, both of Switzerland

[73] Assignee: Ems-Inventa AG, Domat/Ems, Switzerland

[21] Appl. No.: 206,011

[22] Filed: Jun. 10, 1988

Related U.S. Application Data

[63] Continuation-in-part of Ser. No. 3,940, Jan. 16, 1987, abandoned.

[30] Foreign Application Priority Data

Jan. 31, 1986 [CH] Switzerland ............................ 378/86

[51] Int. Cl.$^4$ ....................... C08G 18/42; C08L 75/06
[52] U.S. Cl. .................... 524/539; 524/590; 524/602; 525/440
[58] Field of Search ................ 525/440; 524/590, 539, 524/602

[56] References Cited

U.S. PATENT DOCUMENTS

| | | | |
|---|---|---|---|
| 3,822,240 | 7/1974 | Schmitt | 525/440 |
| 3,991,034 | 11/1976 | Takeo | 525/440 |
| 4,093,674 | 6/1978 | Tsutsui | 525/440 |
| 4,150,211 | 4/1979 | Muller | 525/440 |
| 4,151,220 | 4/1979 | Watamabe | 525/440 |
| 4,246,380 | 1/1981 | Gras | 525/440 |
| 4,413,079 | 11/1983 | Disteldorf | 525/440 |
| 4,442,270 | 4/1984 | Passmore | 528/440 |
| 4,528,355 | 7/1985 | Gras | 528/48 |

*Primary Examiner*—Patricia Short
*Attorney, Agent, or Firm*—Bierman and Muserlian

[57] ABSTRACT

Heat-resistant, polymer-containing, solvent-free adhesive compositions are prepared by reacting a novel mixture of saturated polyester or copolyester with capped isocyanate under the influence of temperature and, if necessary, catalysts, with evident viscosity increase, with cross-linking as appropriate.

The adhesive compositions combine the process-technical properties of low-viscosity melt-adhesives and the strength, tenacity and stability of cross-linked duroplasts or high-viscosity thermoplasts. Subsequent working and protection from explosion are not necessary. Use is possible in each known art for melt-adhesives, e.g. as paste, powder, melt, textiles, or flat structures. In addition, the compositions are suitable as melt coatings or for injection moulding reactions.

14 Claims, No Drawings

POLYESTER MELT-ADHESIVE COMPOSITIONS AND METHODS OF MAKING AND USING THEM

PRIOR APPLICATION

This application is a continuation-in-part of U.S. patent application Ser. No. 003,940 filed Jan. 16, 1987, now abandoned.

The present invention is directed to adhesive compositions which are produced and used in a solvent-free manner and comprise saturated polyesters.

Such polyesters and their copolymers have been known for many years as melt coatings and/or melt adhesives. The heat resistance of such materials is limited by their softening temperature. Materials having higher softening temperatures can be processed only with great difficulty.

Those compositions which utilize unsaturated polyester resins of low viscosity will harden duroplastically; i.e. by cross-linking. Such substances exhibit higher heat resistance than do the corresponding polyesters which are not cross-linked. However, the processing of such duroplasts (or their primary derivatives) is considerably more difficult than processing of thermoplasts. More specifically, especially in serial production, such problems arise due to the fact that the thinly liquid state of such materials is dependent upon their molecular weight.

In Japanese application 51/111,245, there is disclosed the addition of blocked isocyanates to polyester melt adhesives which contain tertiary amino groups. The reference indicates that such addition will improve the adhesion strength. However, tertiary amino groups in the polyester have serious disadvantages; namely, susceptibility to oxidation and an increase in reactivity which is difficult to control. These defects can lead to storage and processing problems.

Capped isocyanates have also been recommended in epoxide-containing adhesives and coatings in EPA-A 0084261 and WO-A 8500375. Other references (CH-A 0479412, JP-A 8081686, JP-A 5714160, EP-A 0047508, etc.) teach that coatings and adhesives having improved properties can be obtained by the addition of isocyanates or capped isocyanates to solvent-containing primers.

The present invention is directed to a composition comprising a saturated polyester component and a capped isocyanate. The polyester component is selected from polyesters, copolyesters, graft copolyesters, and mixtures thereof. Each contains at least two functional groups of the OH and/or COOH type and has a viscosity of at least 12 Pa.s, preferably 20 to 200 Pa.s and most preferably 40 to 150 Pa.s, at 200° C. and 122.6N and a number average molecular weight greater than 10,000. The capped isocyanate has a plurality of functional groups.

In a preferred form of the invention, a catalyst is also present, as well as normal additives. These can comprise up to 30% by weight of the total composition. The isocyanate is also advantageously present in an amount of up to 30% by weight of the total composition.

In essence, by observing the limitations of the present invention, it has been found that the saturated polyesters, copolymers, block copolymers, and graft copolymers thereof, when mixed with di- or higher functional, capped isocyanates produce, after processing, adhesive compositions having much higher heat resistances than the compounds of the prior art. Moreover, it has also been found that the compositions of the present invention undergo a slow increase in melt viscosity at the temperatures immediately above their melting points. Moreover, chemical cross-linking can also ultimately occur. Both of these changes in characteristics can be accelerated by raising the temperature.

In addition, there are formulatons in which the increase in viscosity and/or cross-linking occurs only at temperatures above the melt processing temperature. Such compositions are particularly useful since they can be processed in the melt without any increase in viscosity. After processing is complete, the temperature can be raised further in order to obtain the benefits of the higher viscosity. Of course, catalysts will substantially reduce the time in which these increases take place at a given temperature and enable the compositions to be tailored to the needs of particular uses.

When compositions of the present invention are melted and brought into contact with metals, ceramics, glass, rubber, plastics, textiles, or foam, an excellent bond is achieved after the adhesive has cooled.

The advantages of the present compositions are manifold. In essence, they combine improvements in production with ecological advantages. For example, processing can be carried out within a relatively short time. The compositions are suitable for automatic application, and post-processing is not necessary. Moreover, the fact that no solvent is necessary avoids explosion risks as well as undesirable effects on the environment. At the same time, these compositions have the strength of high-viscosity thermoplasts or chemically cross-linked duroplasts.

The products of the present invention also exhibit greater toughness than either the hardened epoxide resins or the unsaturated polyester resins. They are suitable for application as melt coatings or for use in reaction injection molding. A particularly preferred use of the present compositions is in bonding of flexible materials to solid substrates such as metal, plastic, or molded articles. Such products as floor coverings, woven materials, plastic films, etc. are bonded easily and well by the substances of the present invention.

In a preferred form of the invention, the composition comprises 50 to 99% by weight of the polyester component, 1 to 30% by weight of capped isocyanate, and 0 to 30% by weight of catalysts and/or other additives.

The isocyanates are those having an aliphatic, alicyclic, aromatic, or heterocyclic basic structure. Typical examples are hexamethylenediisocyanate, isophoronediisocyanate, phenylenediisocyanate, toluylenediisocyanate, xylylenediisocyanate, methylene-bis(4-phenylisocyanate), methylene-tris(4-phenylisocyanate), and compounds of formula I and derivatives thereof.

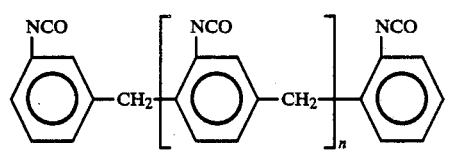

The functional groups are wholly or partially capped with compounds containing at least one reactive hydrogen atom. Such compounds as lactams, amines, imides, ketoximes, alcohols and phenols are particularly satisfactory. As an alternative, the isocyanate groups may react with each other to form the caps as, for example, in the form of urethdiones and triisocyanurates of formulas II and III.

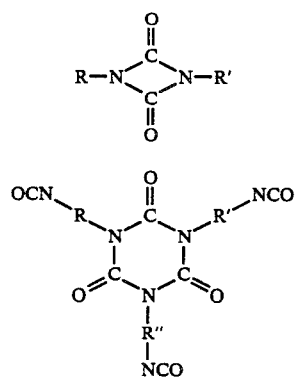

R, R', and R" each represent organic groups and n is ≧0. R, R', and R" are each preferably alkyl, cycloalkyl, and aralkyl, more preferably alkyl and cycloalkyl having 4 to 20 carbon atoms, and aralkyl having 6 to 12 carbon atoms. The catalyst may be one which accelerates or decelerates the reaction. In the former category, such compounds as N-methylpyridine; N,N'-endoethylenepiperazine, and dibutyltindilaurate are quite suitable. As decelerants, p-toluenesulfonic acid and carbamic acid chloride are useful. Insofar as additives are concerned, they are the conventional ones for such adhesive compositions; e.g. stabilizers, plasticizers, fillers, dyes, pigments, etc.

It is one of the advantages of the present invention that these compositions can be made using conventional melt mixing processes and equipment. The components can be mixed by extrusion prior to application or premixed in solid form, melted, and introduced into the adhesive applicator. Such premixing may be in powder, granulate, or other form.

The product may be stored as a solid or added in a continuous process during application. For example, the components or partially premixed components may be introduced into the melt device of the applicator. To apply the mixture, any known coating devices and procedures are appropriate. The application can be as a melt, paste, powder, spray, etc.

The compositions of the present invention are hardened at elevated temperatures which can be produced in any known manner. The heating may be direct or indirect. The use of high frequency induction current or an energized beam has been found suitable. The hardening or viscosity increase can also take place without measurable temperature change. Instead of applying the mixture directly onto the parts to be joined, it is possible to form the composition as a cord, band, film, woven fabric, fleece, or any other solid form and place it between the elements to be joined. When heat is applied, the adhesive will set.

The following examples are intended to illustrate the invention, without limiting its scope. Examples 1 to 6 are directed to the preparation of the starting materials, Examples 7, 9 to 15 and 17 to 20 show the compositions of the present invention, while Examples 8, 16 and 21 are for purposes of comparison. In all cases, the isocyanate contents were determined (in weight percent) in accordance with DIN 53185. The viscosity determinations were carried out using a 1% solution in m-cresol.

EXAMPLE 1

Preparation of capped isocyante 550 g of Desmodur 44M (diphenylmethanediisocyanate from Bayer AG) were introduced into a round flask and heated to 75° C. and 452 g of caprolactam were added with stirring. The resultant exothermic reaction leds to an increase in temperature; by external ice-cooling, the temperature of the reaction mixture was maintained below 140° C. After the reaction stopped, it was stirred for a further 3 hours at 140° C. It was then cooled and the solid product is milled. The product had a melting point of 180° C. and had a residual content of 0.5% free isocyanate. The total content of isocyanate was 17.5%.

EXAMPLE 2

Preparation of capped isocyante

The process was conducted as in Example 1, but 500 g of Desmodur VL (diphenylmethanediisocyanate from Bayer AG) were introduced as the isocyanate. The product melted at 71 C and contained 0.7% free isocyanate. The total isocyanate content were 17.1%.

EXAMPLE 3

Preparation of capped isocyante

The process was conducted as in Example 1, but 429 g of PAPI 80 (multi-isocyanate from Upjohn) were introduced as isocyanate along with 339.6 g of caprolactam as capping agent. The product melted at 72° C. and contained 1.1% free isocyanate. The total isocyanate content was 16%.

EXAMPLE 4

Preparation of capped isocyanate 240 g of phenol were dissolved in toluene together with 0.5 g of triethylamine, the amount of toluene being so calculated that the toluene constituted 60% by weight of the total mixture (including isocyanate). The water of reaction was distilled off azeotropically with the toluene. 315 g of Desmodur 44M were then added with stirring. After the exothermic reaction died down, it was refluxed for an additional 3 hours. The toluene was evaporated off on a rotary evaporator, and the solid white product was dried under vacuum. The product had a melting point of 195° C. and still contained 0.1% free isocyanate. The total isocyanate content was 18.9%.

EXAMPLE 5

Preparation of capped isocyanate

A suspension of 30 g of Desmodur 44M in 250 ml of methylene chloride was slowly added dropwise to 38 g of diethyl malonate and 0.5 g of dimethylaminopyridine. After dropping in the first half of the suspension, the system was heated to boiling and the second half of the suspension was dropped in under reflux. Stirring was continued for an additional 4 hours under reflux. The solvent was then distilled off. The dry product had a free isocyanate content of 1.4%.

EXAMPLE 6

Preparation of capped isocyanate 166.59 g of Desdomur 44M were dissolved in toluene with heating. Following complete solution of the Desmodur, 0.29 g of tributylphosphine were added. The reaction product started to precipitate out slowly. The reaction was allowed to proceed for about 4 hours more, and 0.29 g of toluenesulfonic acid methyl ester were then added. After a further hour, the reaction product was filtered off, washed and dried. The product contained no free isocyanate according to DIN 53185.

EXAMPLE 7

Polyester composition of increasable viscosity 930 g of Griltex 6 (copolyester from EMS-Chemie AG) having a viscosity of 100 Pa.s at 200° C. and 122.6N was extruded at 150° C. with 930 g of Griltex 8 (copolyester from EMS-Chemie AG) having a viscosity of 120 Pa.s at 200° C. and 122.6N and 120 g of the product of Example 1. The extrudate had a DSC-melting point of 117° C. and a relative viscosity of 1.67. Subsequent heating of the extrudate to 200° C. leads to solution viscosities of 1.95 after 5 minutes and 2.05 after 15 minutes.

EXAMPLE 8

Comparison to Example 7

930 g of Griltex 6 and 930 g of Griltex 8 are extruded as in Example 7, but without the addition of the product of Example 1. The relative viscosity was 1.67 directly after extrusion, 1.68 after 5 minutes at 200° C. and 1.67 after 15 minutes at 200° C.

EXAMPLE 9

Polyester composition of increasable viscosity

Extrusion was conducted at 200° C. in the same manner as in Example 7. The relative viscosity of the extrudate was 2.01 and increased to 2.04 after 5 minutes at 200° C. and to 2.09 after 15 minutes at 200° C.

EXAMPLE 10

Polyester composition of increasable viscosity 200 g of Griltex 8 (copolyester from EMS-Chemie AG) were mixed in the melt with 20 g IPDI BF 1540 (isophoronediisocyanate intra-molecularly capped by means of urethdione groups, from Chemische Werke Huels) and with 0.4 g of dibutyltin dilaurate in a 1 l. capacity glass cylinder. The relative viscosity of the mixture was 1.66. Temperature treatment of the mixture for 20 minutes at 210° C. leds to a solution viscosity of 1.97.

EXAMPLE 11

Polyester composition of increasable viscosity

5% by weight of the product of Example 1 were mixed, with stirring, into Griltex 8, following the procedure of Example 10. The relative viscosity of the product was 1.80. Heating the product to 230° C. leds to viscosities of 1.87 after 2 minutes and, further, up to 2.27 within 10 minutes.

EXAMPLE 12

Cross-linkable polyester composition

10% by weight of the product of Example 1 was mixed, with stirring, into Griltex 6, following the procedure of Example 10. The product had a relative viscosity of 1.78. Following temperature treatment of 5 minutes at 250° C., it was insoluble, but clearly swellable, in m-cresol.

EXAMPLE 13

Polyester composition of increasable viscosity

The experiment of Example 11 was conducted using 5% by weight of the product of Example 2. The relative viscosity rose to 2.13 after 8 minutes at 200° C.

EXAMPLE 14

Polyester composition of increasable viscosity 25 g of the product of Example 4 were worked into 225 g of Griltex 8, following the procedure of Example 10. The resultant mixture had a relative viscosity of 1.70. Subsequent heating of the mixture at 200° C. leds to partial cross-linking after 10 minutes. The mixture was no longer completely soluble in m-cresol. After filtering off the insoluble gel part, a relative viscosity of 2.25 was found.

EXAMPLE 15

Cross-linkable polyester composition 18 g of the product of Example 3 were mixed, with stirring, into 260 g of Griltex 6, following the procedure of Example 10. The relative viscosity of the product was 1.69. After 10 minutes at 200° C. or 5 minutes at 250° C., the product was insoluble in m-cresol.

EXAMPLE 16

Cross-linkable polyester composition (comparative example)

The experiment of Example 15 was repeated. Instead of Griltex 6, a copolymer prepared from 35.3 parts by weight of terephthalic acid, 23.9 parts by weight of neopentyl glycol, 1.49 parts by weight of trimethylolpropane having an acid number corresponding to 0.5 mg KOH/g and a hydroxyl number corresponding to 39.9 mg KOH/g, were introduced. The melt viscosity was 9 Pa.s at 200° C. and 122.6N (according to DIN 53735). The relative viscosity of the mixture is 1.28. After 2 minutes at 230° C., the product was insoluble in m-cresol and only weakly swellable.

EXAMPLE 17

Cross-linkable polyester composition

10% of the product prepared according to Example 5 was mixed, with stirring, in Griltex 6 in a manner analogous to that of Example 10. The relative viscosity of the product was 1.61. After 5 minutes hardening at 250° C., the product was insoluble in m-cresol.

EXAMPLE 18

Cross-linkable polyester composition 1800 g of Griltex is extruded with 200 g of the product prepared according to Example 6. The extrudate had a relative viscosity of 1.70. Hardening for 5 munutes at 200° C. was sufficient to give a product insoluble in m-cresol.

EXAMPLE 19

The polyester composition of Example 10 (relative viscosity in 1% m-cresol: 1.66) was milled at −78° C. in a hammer mill. The 200–500 um powder fraction was removed from the pulverized product by sieving. The powder was coated onto polyurethane foam material by scattering. The coating weight of the adhesive powder was 80 g/m$^2$. The powder was sintered under an infra-red radiator (surface temperature 160° C.) and then bonded with a polyester decorative material at 220° C. The tear strength of the bond, determined as the separation strength of a 5 cm wide strip, such that the decorative material was torn off at an angle of 180°, was 26N. The foam material failed under this force, but the bond remained satisfactory. The heat-resistance was also determined by tearing through 180°. After tearing, hanging strips were loaded with a weight of 100 g and heated to 90° C., 100° C. and 110° C., respectively, for 100 hours. The delamination lengths during this time are 1 mm, 1 mm and 3 mm, respectively.

EXAMPLE 20

The test of Example 19 was repeated using the polyester composition of Example 15. At temperature loading for 100 hours at the temperatures of 90°, 100° and 110° C., no delamination was observed. At 120° C., the delaimination distance was 3 mm.

EXAMPLE 21

The tests were repeated using a composition of Example 15, and after loading the hanging strips with a 100 g weight and heating to 90° C., 100° C. and 110° C. for 100 hours, no delamination was observed. At 120° C., the delaimination distance was only 3 mm.

Using the comparative sample as described in Example 8, the tests were repeated and delamination distances of 3 mm, 10 mm and 26 mm were obtained. The decorative material delaminated completely at 120° C.

The same tests were conducted using an adhesive sample of comparative Example 16. As this adhesive falls outside the limitation of the invention, it was used as a comparative sample and the tear strength measured only 0.9N. This low tear strength is attributable to the low viscosity of the samples. The low viscosity adhesive totally penetrated the test substrate.

As shown in Table 1, these tests prove that, by adhering to the limitations of the invention, a stronger, more heat-resistant bond can be obtained. These results are not anticipated by the prior art and are unexpectedly superior.

TABLE I

| Material | Viscosity (Melt viscosity at 160°) | Tear Strength | Heat resistance (delamination distance after 100 hours) | | | |
|---|---|---|---|---|---|---|
| | | | 90° C. | 100° C. | 110° C. | 120° C. |
| Spec. Example 10 (present invention) | 800 | 26N (foam failed, adhesive held) | <1 mm | <1 mm | <3 mm | — |
| Spec. Example 15 (present invention) | 950 | 26N | 0 | 0 | 0 | <3 mm |
| Spec. Example 8 (comparative sample) (NO ISOCYANATE) | 850 | — | 3 mm | 10 mm | 26 mm | Complete delamination |
| Spec. Example 16 (low viscosity) | 85 | .9N | — | — | — | — |

Example comparative to Examples 19+20

The same test as in Example 19 was conducted using the polyester composition of Example 8, delamination distances of 3 mm, 10 mm and 26 mm, respectively, were obtained. The decorative material delaminates completely at 120° C.

EXAMPLE 22

Adhesive powder samples of the present invention were compared with samples of the prior art and the samples were coated onto a polyurethane foam material by scattering for a coating weight of the adhesive powder of 80 g/m². The powder was centered under an infra-red radiator (surface temperature 100° C.), and bonded with a polyester decorative material at 200° C. The polyester composition of Example 10 was tested for tear strength and heat resistance. The tear strength of the bond, the force necessary to separate a 5 cm wide strip of the decorative material from the polyurethane base at 180° angle, was 26N. While the foam failed under this force, the bond remained satisfactory. After tearing, heat-resistance was determined by loading the hanging strips with a weight of 100 g and heating the strips to 90° C., 100° C. and 110° C. for 100 hours. After 100 hours, delamination lengths were less than 1 mm, 1 mm and 3 mm, respectively.

EXAMPLE 23

Cross-linkable polyester composition 100 g of a polyester prepared from 45 parts by weight of terephthalic acid, 55 parts by weight of isophthalic acid and 90 parts by weight of butanediol with a relative viscosity of 1.37 and a melt viscosity of 14 Pa.s at 200° C. and 122.6N (according to DIN 53735) were mixed with 12 g of the product of Example 3 of the above application. After heating at 210° C. for 3 minutes, the product was insoluble in m-cresol. The test of Example 19 of the above application was repeated using the above polyester and the delamination distance determined after 100 hours at 90° C., 100° C., 110° C. and 120° C. were 0, 0, 1 and 3 mm respectively.

While only a limited number of specific embodiments of the present invention have been expressly disclosed, it is, nonetheless, to be broadly construed, and not to be limited except by the character of the claims appended hereto.

What we claim is:

1. An adhesive composition comprising a saturated polyester component containing at least 2 OH and/or COOH functional groups and having a viscosity of at least 12 Pa.s at 200° C. and 122.6N and a number average molecular weight greater than 10,000, and a capped isocyanate having more than one functional group.

2. The composition of claim 1 further comprising up to 30% by weight of catalysts and/or other additives.

3. The composition of claim 2 wherein there is 50 to 99% by weight of said polyester component and 1 to 30% by weight of said isocyanate.

4. The composition of claim 1 wherein said isocyanate is taken from the class consisting of aliphatic, alicyclic, aromatic, and heterocyclic isocyanates.

5. The composition of claim 4 wherein said isocyanate is taken from the class consisting of hexamethylenediisocyanate, isophoronediisocyanate, phenylenediisocyanate, tolulylenediisocyanate, xylylenediisocyanate, methylenebis(4-phenylisocyanate), methylenetris(4-phenylisocyanate), compounds of formula I and derivatives and the mixtures thereof

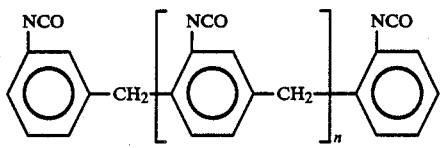

wherein n≧0.

6. The composition of claim 1 wherein said isocyanate is capped with a compound having at least one reactive hydrogen.

7. The composition of claim 6 wherein said compound is taken fronm the class consisting of lactams, amines, imides, ketoximes, alcohols, and phenols.

8. The composition of claim 1 wherein said capped isocyanate is capped by reaction with itself or another isocyanate.

9. The composition of claim 8 wherein said capped isocyanate is

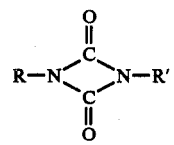

or

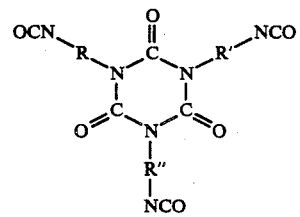

wherein R, R' and R" are each organic groups.

10. The composition of claim 2 wherein said catalyst is taken from the class consisting of N-methylpyridine, N,N'-endoethylenepiperazine, dibutyltindilaurate, p-toluenesulfonic acid and carbamic acid chloride.

11. The composition of claim 9 wherein said organic groups are alkyls cycloalkyls or aralkyls.

12. The composition of claim 11 wherein said alkyls and said cycloalkyls have 4 to 20 carbon atoms and said aralkyls have 7 to 12 carbon atoms.

13. The composition of claim 1 wherein the polyester component has a viscosity of 20 to 200 Pa.s at 200° C.

14. The composition of claim 1 wherein the polyester component has a viscosity of 40 to 150 Pa.s at 200° C.

* * * * *